United States Patent
Kishida

(10) Patent No.: US 8,834,154 B2
(45) Date of Patent: Sep. 16, 2014

(54) TRANSITION PIECE OF COMBUSTOR, AND GAS TURBINE HAVING THE SAME

(71) Applicant: Mitsubishi Heavy Industries, Ltd., Tokyo (JP)

(72) Inventor: Hiroaki Kishida, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 43 days.

(21) Appl. No.: 13/687,557

(22) Filed: Nov. 28, 2012

(65) Prior Publication Data

US 2014/0144147 A1    May 29, 2014

(51) Int. Cl.
  *F23R 3/06* (2006.01)
  *F01D 9/02* (2006.01)
  *F02C 7/18* (2006.01)

(52) U.S. Cl.
  CPC . *F01D 9/023* (2013.01); *F23R 3/06* (2013.01); *F02C 7/18* (2013.01); *F23D 2203/1055* (2013.01)
  USPC .......................................... 431/352; 60/754

(58) Field of Classification Search
  CPC .............. F02C 7/18; F23R 3/002; F23R 3/06; F23R 3/08; F23D 2214/00; F23D 2203/105; F23D 2203/1055
  USPC .............................. 60/754, 752, 757; 431/352
  See application file for complete search history.

(56) References Cited

U.S. PATENT DOCUMENTS

| 4,004,056 A * | 1/1977 | Carroll ............................ 60/754 |
| 6,282,905 B1 * | 9/2001 | Sato et al. ...................... 60/754 |
| 6,546,731 B2 * | 4/2003 | Alkabie et al. ................. 60/754 |
| 2013/0098063 A1 * | 4/2013 | Mizukami et al. ............. 60/754 |

FOREIGN PATENT DOCUMENTS

| JP | 60-143272 U | 9/1985 |
| JP | 62-150543 U | 9/1987 |
| JP | 07-198141 A | 8/1995 |
| JP | 10-227229 A | 8/1998 |
| JP | 2000-145479 A | 5/2000 |

OTHER PUBLICATIONS

Japanese Office Action dated Jul. 31, 2012, issued in corresponding Japanese Patent Application No. 2011-176723 with partial translation (3 pages).

* cited by examiner

*Primary Examiner* — J. Gregory Pickett
(74) *Attorney, Agent, or Firm* — Westerman, Hattori, Daniels & Adrian, LLP

(57) ABSTRACT

A transition piece of a combustor that sends high temperature combustion gas to a turbine includes a cylindrical body wall and cooling air passages. The passages are formed in the body wall so as to extend in an axial direction thereof, and each of the passages has cooling air inlet ports opened at an outer circumferential surface of the transition piece and cooling air outlet ports opened at an inner circumferential surface of the transition piece. The cooling air outlet ports form a plurality of lines in a direction oblique with respect to the axial direction of the body wall. A first distance between a first line of the cooling air outlet ports and a second line of the cooling air outlet ports adjacent to the first line is larger than a second distance between the cooling air outlet ports adjacent to each other.

12 Claims, 9 Drawing Sheets

TRANSITION PIECE OF COMBUSTOR, AND GAS TURBINE HAVING THE SAME

TECHNICAL FIELD

The present invention relates to a transition piece of a combustor and a gas turbine having the same.

BACKGROUND ART

A combustor of a gas turbine includes a transition piece that sends high-temperature and high-pressure combustion gas to a turbine.

A body wall forming the transition piece has a structure that guides cooling air into the body wall in order to prevent the burnout of the transition piece. Specifically, a plurality of cooling air passages, which extend in the axial direction of the transition piece, are formed in the body wall, and a cooling air inlet port opened to the outer circumferential surface of the body wall and a cooling air outlet port opened to the inner circumferential surface of the body wall are formed at each of the plurality of cooling air passages. Cooling air is introduced into the cooling air passages from the cooling air inlet ports, and flows into the transition piece from the cooling air outlet ports.

The cooling air outlet port, which is formed at each of the plurality of cooling air passages, is often formed at the same position in the axial direction of the transition piece. In order to increase thermal efficiency, a gas turbine in recent years has been designed so that the temperature of combustion gas flowing in the transition piece is higher than that in the past. In the transition piece, the number of the cooling air passages is increased and a distance between adjacent cooling air passages is reduced more than that in the past to improve the cooling effect of the body wall.

Cracks tend to occur in the body wall of the transition piece from the cooling air outlet ports first, where the thermal environment is severe and stress is apt to be concentrated. In addition, when a distance between the cooling air passages is reduced than that in the past as described above, the distance between adjacent cooling air outlet ports is also reduced. Accordingly, when a crack occurs in the body wall from a certain cooling air outlet port first, the crack is apt to be connected to the next cooling air outlet port. As a result, the growth of the cracks is facilitated.

Japanese Unexamined Utility Model Application, First Publication No. S62-150543 discloses that cooling air outlet ports of a plurality of cooling air passages are arranged so as to be staggered. When the cooling air outlet ports are arranged in this way, since the positions of the adjacent cooling air outlet ports are different from each other in the axial direction of the transition piece, even if a distance between the adjacent cooling air passages is reduced, the distance between the adjacent cooling air outlet ports is ensured so as to be larger than the distance between the cooling air passages. Therefore, even if a crack occurs from a certain cooling air outlet port first, it is possible to suppress the growth of the cracks to some extent.

MEANS FOR SOLVING THE PROBLEM

The invention provides a transition piece of a combustor that sends high temperature combustion gas to a turbine. The transition piece includes a cylindrical-formed body wall; and a plurality of cooling air passages formed in the body wall so as to extend in an axial direction of the cylindrical body wall. Each of the cooling air passages has cooling air inlet ports opened at an outer circumferential surface of the transition piece and cooling air outlet ports opened at an inner circumferential surface of the transition piece. The cooling air outlet ports form a plurality of lines in a direction oblique with respect to the axial direction of the body wall. A first distance between a first line of the cooling air outlet ports and a second line of the cooling air outlet ports adjacent to the first line is larger than a second distance between the cooling air outlet ports adjacent to each other.

Most of the cracks in the body wall tend to extend in a direction, which is substantially perpendicular to the principal stress applied to the body wall, from the cooling air outlet ports. For this reason, even if a crack occurs from a certain cooling air outlet port of a certain line and another crack occurs from another cooling air outlet port of the same line, which is adjacent to the cooling air outlet port, when a principal stress is applied in a direction where the plurality of cooling air outlet ports forming the lines are arranged, that is, a direction oblique with respect to an axis, these two cracks extend in the directions substantially perpendicular to the directions where the principal stresses are applied. However, the two cooling air outlet ports from which the cracks occur, are adjacent to each other in a direction oblique with respect to the axial direction of the body wall, that is, the direction where the principal stress is applied. Accordingly, it is possible to suppress the connection between the two cracks.

Further, the first distance between the first line of the cooling air outlet ports and the second line of the cooling air outlet ports adjacent to the first line is larger than the second distance between the cooling air outlet ports adjacent to each other. For this reason, even if a crack occurs from a certain cooling air outlet port of a certain line and another crack occurs from another cooling air outlet port of the same line, which is adjacent to the cooling air outlet port, it is possible to suppress the connection between the two cracks.

Accordingly, even if a crack occurs from a certain cooling air outlet port and another crack occurs from another cooling air outlet port, which is adjacent to the cooling air outlet port regardless of a direction in the transition piece, it is possible to suppress the connection between the two cracks.

That is, according to the transition piece of the invention, even if a distance between adjacent cooling air passages is reduced more than that in the past to improve the cooling effect of the body wall, it is possible to suppress the growth of the cracks.

In the transition piece of the invention, when assuming a hypothetical plane including a rotation axis of a turbine rotor of the turbine and an axis of the cylindrical body wall, the lines of the cooling air outlet ports formed in one side part of the body wall may be oblique with respect to the hypothetical plane so as to be closer to the hypothetical plane as they approach a rear end of the transition piece and the lines of the cooling air outlet ports formed in the other side part of the body wall may also be oblique with respect to the hypothetical plane so as to be closer to the hypothetical plane as they approach the rear end of the transition piece.

When high temperature combustion gas flows in the body wall formed in a cylindrical shape, a principal stress is applied to one side part of the body wall with respect to the hypothetical plane in a direction that is closer to the hypothetical plane toward the rear end of the transition piece and a principal stress is also applied to the other side part of the body wall with respect to the hypothetical plane in a direction that is closer to the hypothetical plane toward the rear end of the transition piece. For this reason, the plurality of cooling air outlet ports, which are formed at the one side part with respect to the hypothetical plane, are arranged in the direction where the principal stress is applied to form lines; and the plurality of cooling air outlet ports, which are formed at the other side part with respect to the hypothetical plane, are also arranged in the direction where the principal stress is applied to form lines. Accordingly, it is possible to suppress the growth of the cracks at both side parts of the hypothetical plane in the transition piece.

In the transition piece of the invention, each of the lines of the cooling air outlet ports may include three or more of the cooling air outlet ports.

As the number of the cooling air outlet ports forming each line is increased, a distance between adjacent lines is increased. For this reason, even if a crack occurs from a certain cooling air outlet port of a certain line and another crack occurs from another cooling air outlet port of another line, which is adjacent to the line including the cooling air outlet port in the transition piece, it is possible to suppress the connection between two cracks.

In the transition piece of the invention, the lines of the cooling air outlet ports may be formed in the body wall so as to be located at the middle portion of the body wall in a flow direction of the combustion gas and at a downstream side of the middle portion.

In general, the cross-sectional area of the transition piece is gradually reduced toward the rear end. For this reason, the flow rate of combustion gas flowing in the transition piece is gradually increased toward the rear end of the transition piece. Accordingly, the heat input from the combustion gas at the downstream portion of the transition piece is larger than that at the upstream portion of the transition piece. It is possible to improve the cooling effect of the downstream portion of the body wall by making the distance between the cooling air passages short while suppressing the growth of the cracks at the downstream portion, where the heat input from combustion gas is relatively large, in the transition piece.

In the transition piece of the invention, a distance between the cooling air inlet port and the cooling air outlet port may be the same for each of the cooling air passages. In this case, the cooling air inlet ports of the plurality of cooling air passages are arranged in the same direction as the direction where the line of the cooling air outlet ports extends.

In the transition piece of the invention, the lines of the cooling air outlet ports may extend in a direction of a principal stress caused in the inner circumferential surface of the body wall while the combustion gas flows inside the body wall.

As described above, cracks tend to extend in the direction substantially perpendicular to the direction where the principal stress is applied. For this reason, even if a crack occurs from a certain cooling air outlet port of a certain line and another crack occurs from another cooling air outlet port of the same line, which is adjacent to the cooling air outlet port, when the lines of the cooling air outlet ports extend in the direction where a principal stress is applied, it is possible to suppress the connection of the two cracks.

A gas turbine of the invention includes a combustor having the transition piece, a compressor configured to supply compression air to the combustor, and a turbine configured to be driven by combustion gas generated in the combustor.

In the gas turbine, it is possible to suppress the growth of cracks in the body wall even if a distance between a plurality of cooling air passages is reduced than that in the past to obtain a high cooling effect in a body wall forming a transition piece.

MODE FOR CARRYING OUT THE INVENTION

A gas turbine according to an embodiment of the invention will be described in detail below with reference to FIGS. 1 to 7.

Figure 7:
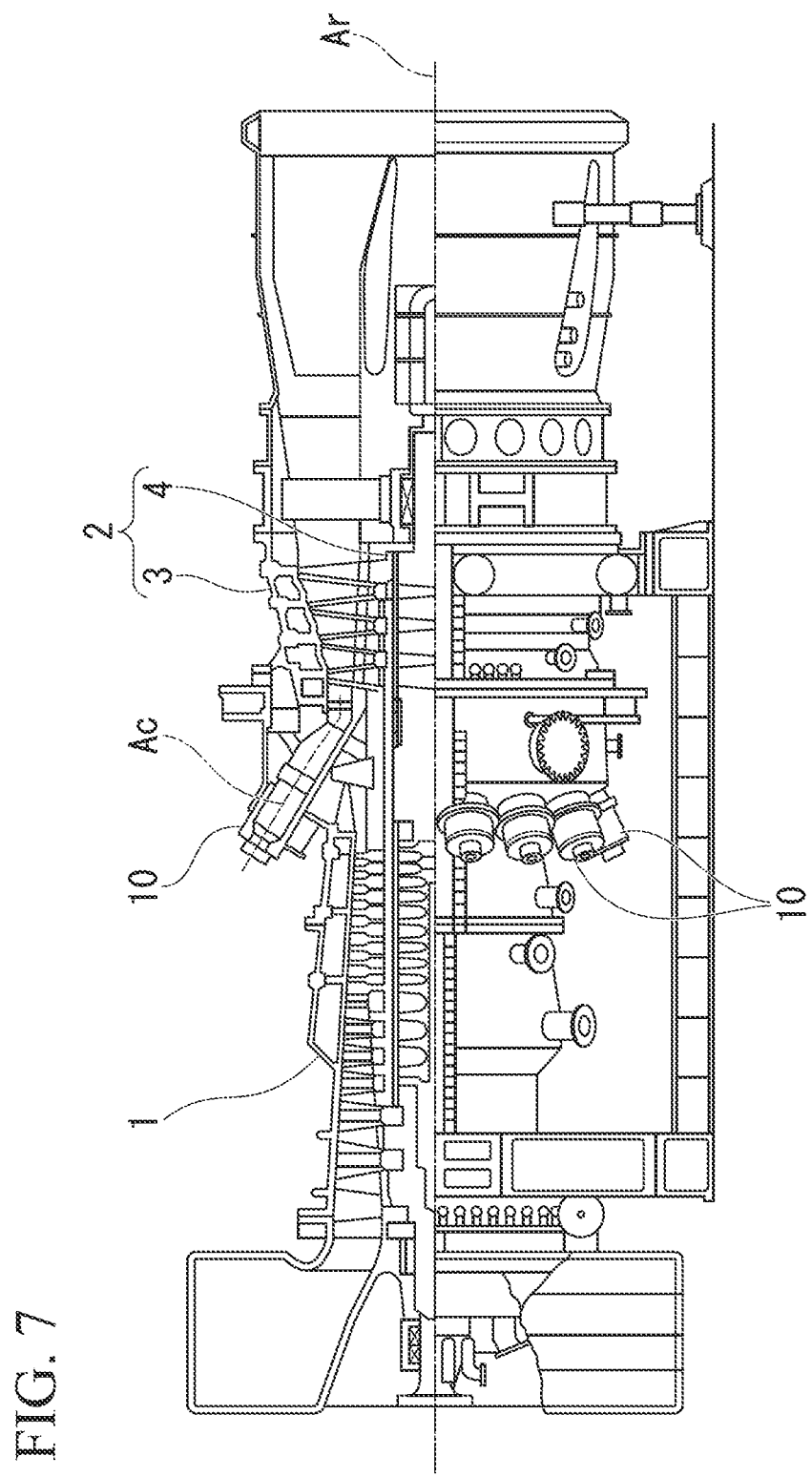
FIG. 7 is a sectional side view of the entire main part of the gas turbine according to the embodiment of the invention.

As shown in FIG. 7, a gas turbine according to this embodiment includes a compressor 1 that generates compression air by compressing outside air; a plurality of combustors 10 that generates combustion gas by mixing fuel, which is supplied from a fuel supply source, with compression air and combusting a mixture of the fuel and the compression air; and a turbine 2 that is driven by the combustion gas.

The turbine 2 includes a casing 3 and a turbine rotor 4 that is rotated in the casing 3. The turbine rotor 4 is connected, for example, to a generator (not shown) that generates electricity by the rotation of the turbine rotor 4. The plurality of combustors 10 is fixed to the casing 3 so as to be disposed around a rotation axis Ar of the turbine rotor 4 at regular intervals in the circumferential direction.

Figure 6:
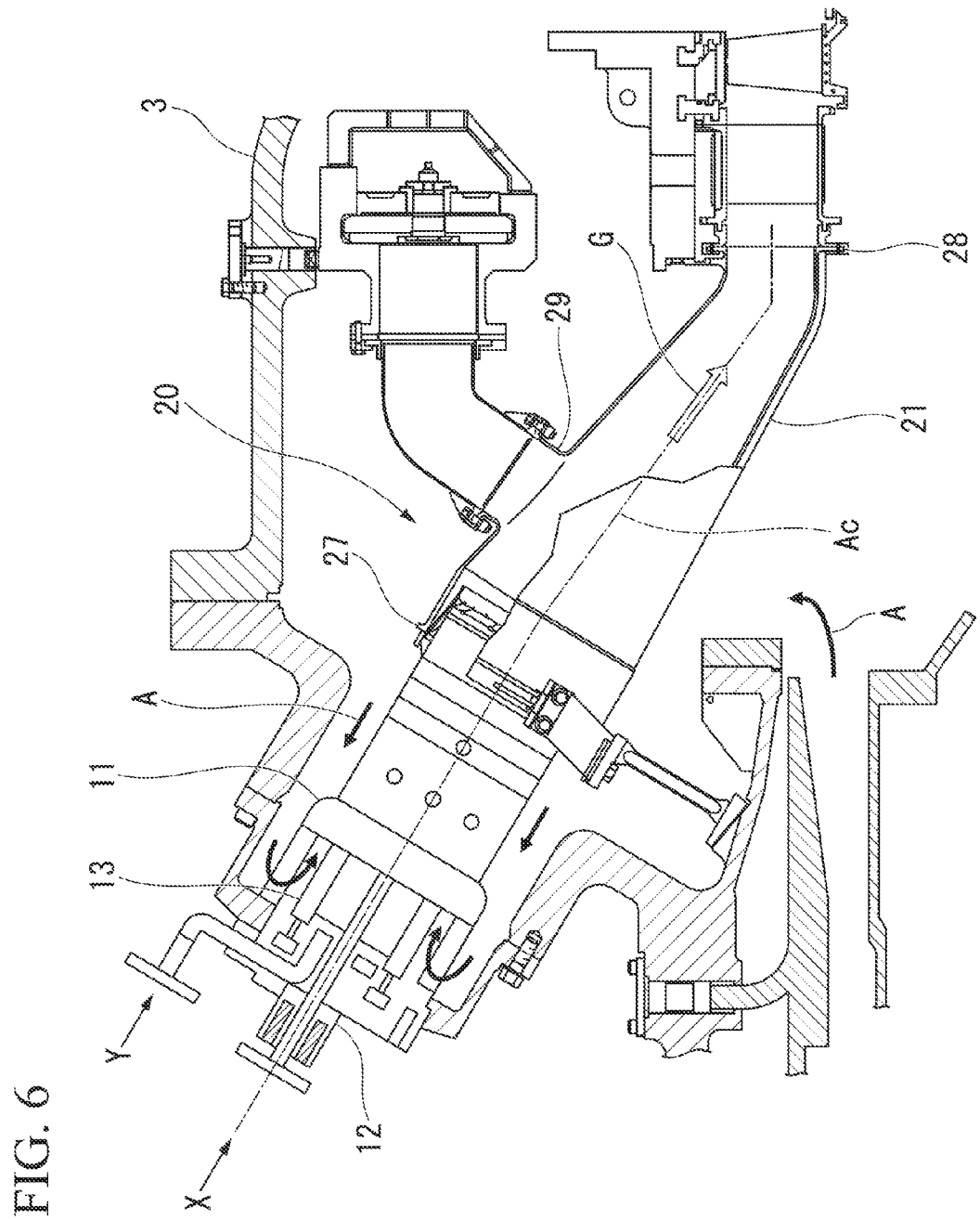
FIG. 6 is a cross-sectional view of a main part of a gas turbine according to the embodiment of the invention.

As shown in FIG. 6, the combustor 10 includes a transition piece 20 that sends high-temperature and high-pressure combustion gas G to the turbine 2, and a fuel supplier 11 that supplies fuel and compression air into the transition piece 20. The fuel supplier 11 includes a pilot burner 12 and a plurality of nozzles 13. The pilot burner 12 supplies pilot fuel into the transition piece 20 in the direction of an arrow X, supplies compression air into the transition piece 20 in a direction of an arrow A, and forms diffusion flames in the transition piece 20. The nozzles 13 premix main fuel Y with compression air A, supply a pre-mixture of the main fuel and the compression air into the transition piece 20 as premixed gas, and form premixed flames in the transition piece 20.

The transition piece 20 includes a body wall 21 that is formed in a cylindrical shape, an upstream frame 27 that is mounted on the upstream end of the body wall 21, a downstream frame 28 that is mounted on the downstream end of the body wall 21, and a bypass pipe connecting flange 29 that sends the compression air A generated from the compressor 1 to the upstream side of the body wall 21 without the fuel supplier 11.

Figure 5:
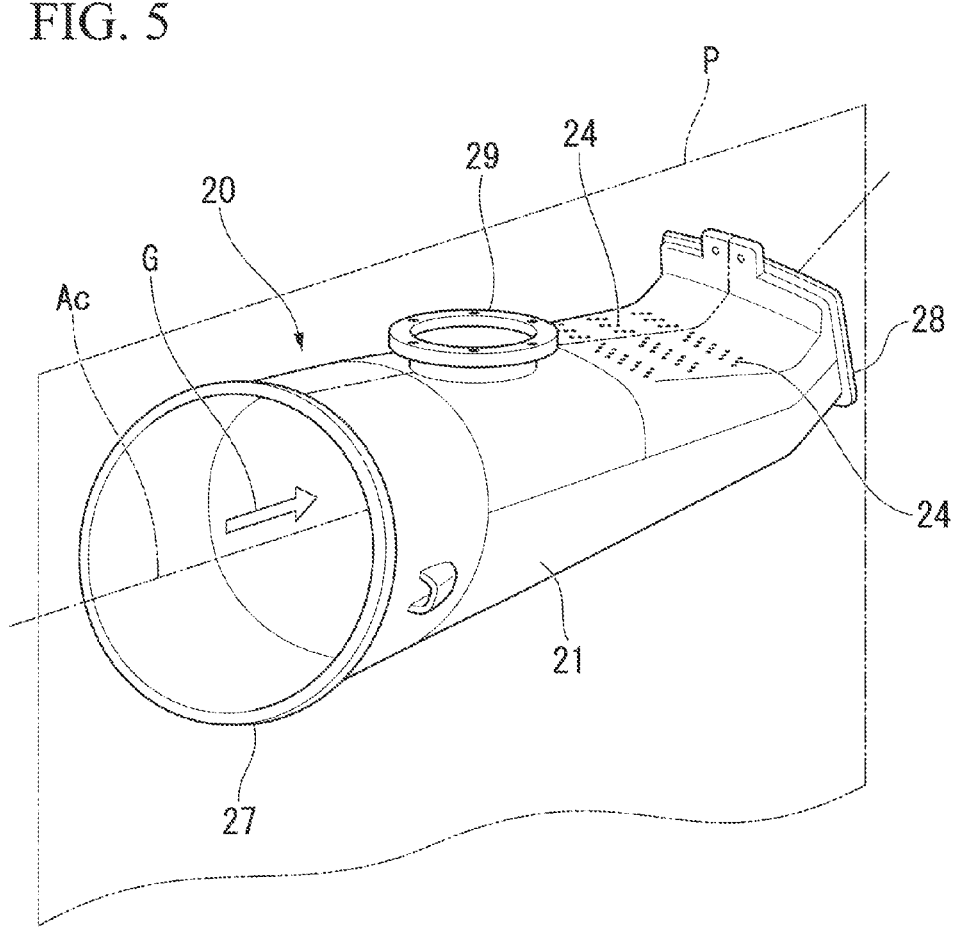
FIG. 5 is a perspective view of the transition piece according to the embodiment of the invention.

As shown in FIG. 5, the cross-sectional shape of the upstream side of the body wall 21, which is formed in the cylindrical shape, is a circular shape, and the cross-sectional shape of the downstream side of the body wall is a substantially rectangular shape. For this reason, the upstream frame 27 has a circular shape and the downstream frame 28 has a substantially rectangular shape. Further, the cross-sectional area of the body wall 21, which is formed in the cylindrical shape, is gradually reduced toward the downstream side from the upstream side.

The body wall 21 is formed so that the center of the cross section of the body wall perpendicular to a predetermined axis Ac is positioned on the axis Ac. In other words, the axis Ac is formed by connecting the centers of the cross sections of the body wall 21 at the positions in the flow direction of the combustion gas G. Further, in this embodiment, the cylindrical body wall 21 is symmetrical with respect to a hypothetical plane P, which includes the axis Ac of the transition piece 20 and the rotation axis Ar of the turbine rotor 4, toward the downstream side.

Figure 1:
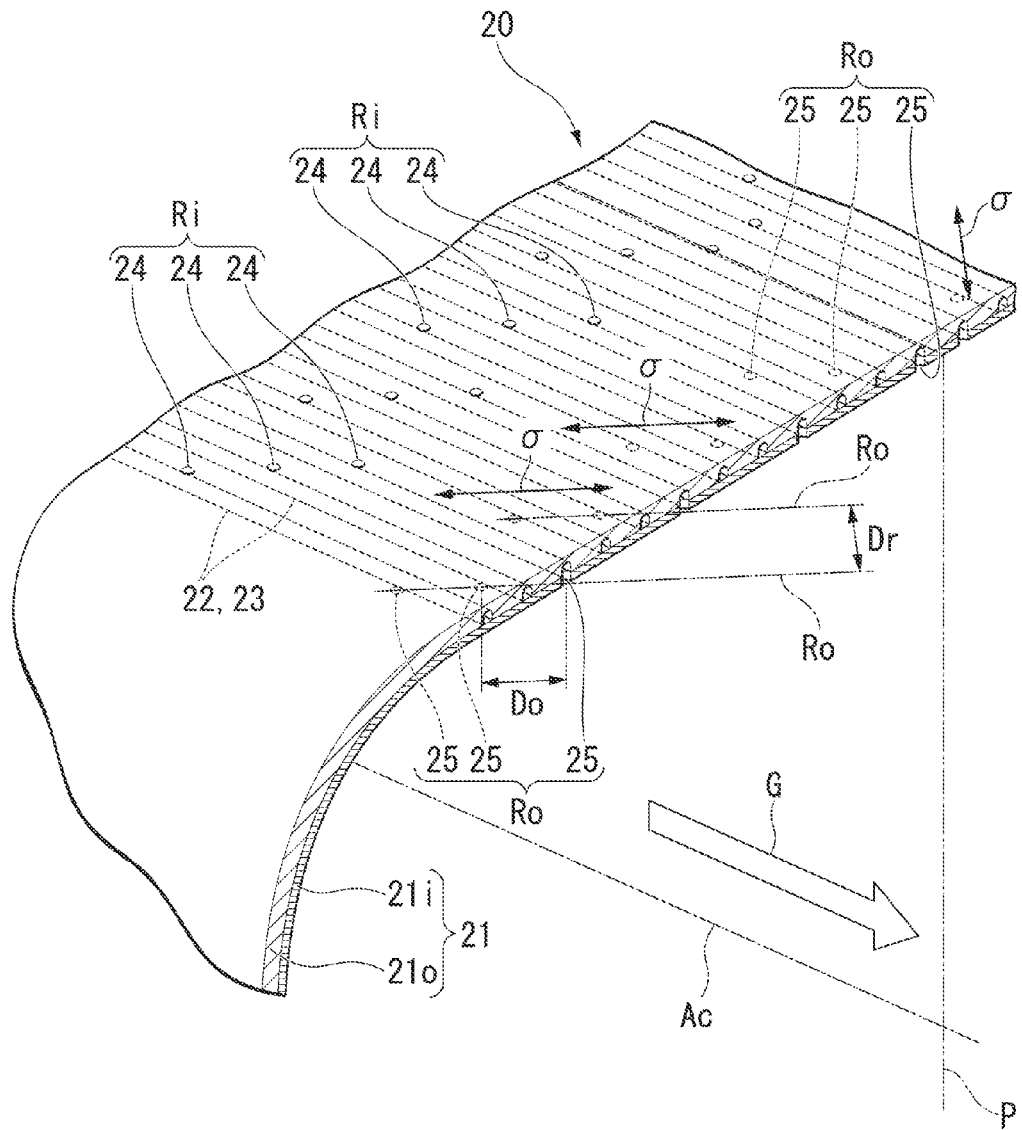
FIG. 1 is a sectional perspective view of a main part of a transition piece according to an embodiment of the invention.

As shown in FIG. 1, the body wall 21 is formed by bending a wall that is formed by joining an outer body wall 21o to an inner body wall 21i. A plurality of grooves 22, which extend in a direction of the axis Ac are formed on the inner circumferential surface of the outer body wall 21o, which is disposed on the outer side, of the outer body wall 21o and the inner body wall 21i of the body wall 21. The inner body wall 21i is joined to the inner circumferential surface of the outer body wall 21o. Since the inner body wall 21i is joined to the inner circumferential surface of the outer body wall 21o, the grooves 22 form a part of cooling air passages 23 formed in the body wall 21.

A cooling air inlet port 24 of the cooling air passage 23 that is opened to the outer circumferential surface of the body wall 21 and a cooling air outlet port 25 of the cooling air passage 23 that is opened to the inner circumferential surface of the body wall 21 are formed in the body wall 21 for each of the plurality of cooling air passages 23. That is, the plurality of cooling air passages 23, which extend in the direction of the axis Ac of the body wall 21 are formed in the body wall 21, and each of the cooling air passages 23 includes the cooling air inlet port 24 that is opened to the outer circumferential surface of the transition piece 20 and the cooling air outlet port 25 that is opened to the inner circumferential surface of the transition piece 20.

The cooling air outlet ports 25 of the plurality of cooling air passages 23 form a plurality of lines Ro, and the plurality of cooling air outlet ports 25 forming the lines Ro are arranged in a direction oblique with respect to the axis Ac. One line Ro is formed of three cooling air outlet ports 25 in this embodiment.

Figure 3:
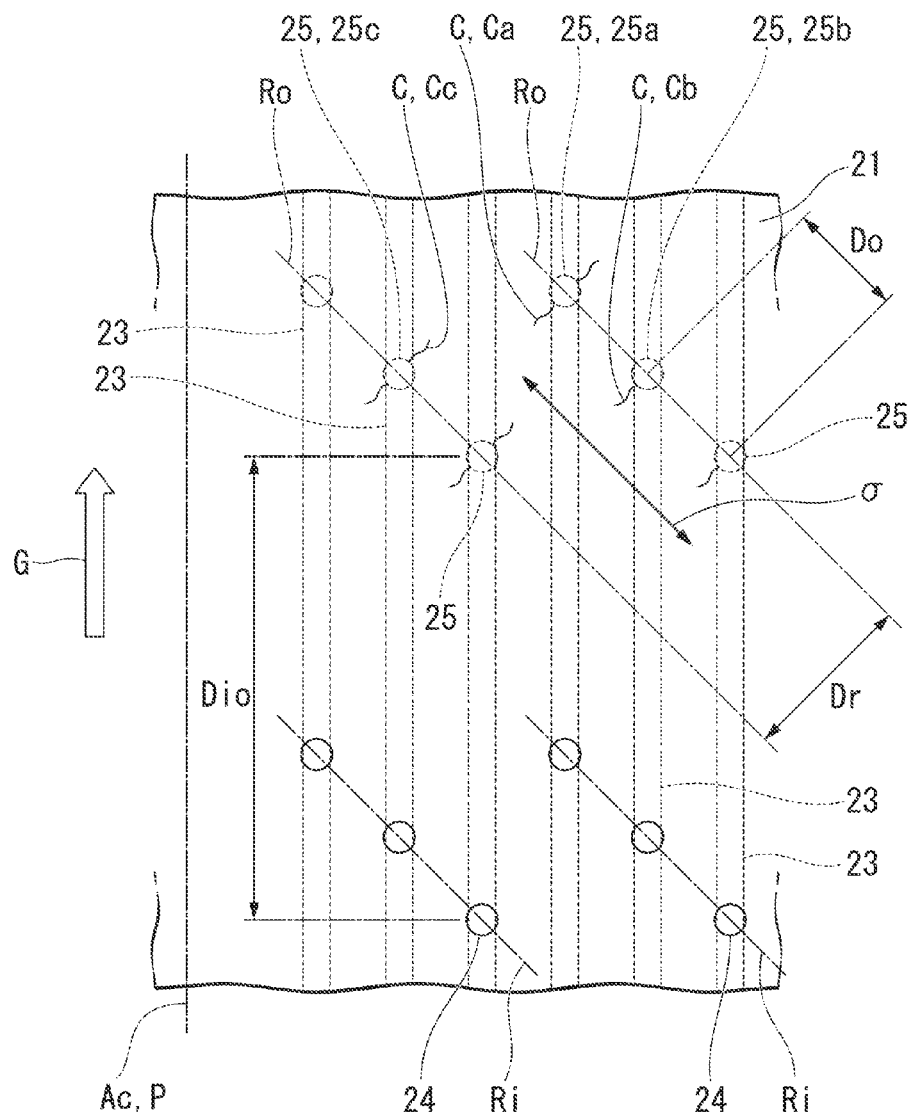
FIG. 3 is a plan view of a main part of the transition piece according to the embodiment of the invention.

A distance Dio between the cooling air inlet port 24 and the cooling air outlet port 25, which make a pair, of each of the plurality of cooling air passages 23 is substantially the same in the plurality of cooling air passages 23 as shown in FIG. 3. That is, the distance Dio between the cooling air inlet port 24 and the cooling air outlet port 25 is substantially the same for all the cooling air passages 23. For this reason, the cooling air inlet ports 24 of the plurality of cooling air passages 23 also form a plurality of lines Ri like the cooling air outlet ports 25, and the plurality of cooling air inlet ports 24 forming the lines Ri are arranged in a direction where the lines Ro of the cooling air outlet ports 25 extend.

Figure 2:
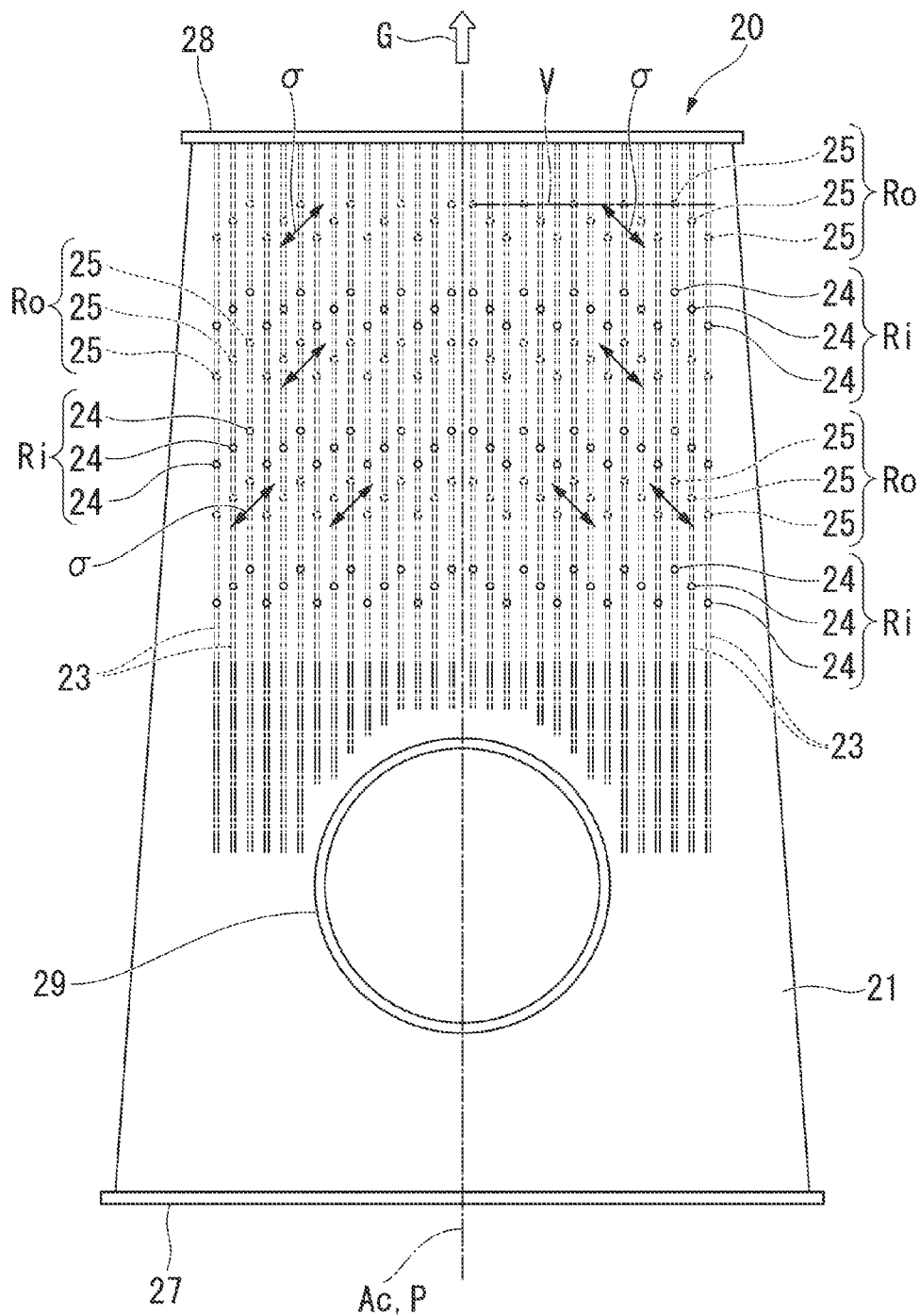
FIG. 2 is a plan view of the transition piece according to the embodiment of the invention.

As shown in FIGS. 2 and 5, all the plurality of cooling air outlet ports 25 forming the lines Ro are formed at a downstream portion, which includes a middle portion in the flow direction of the combustion gas G, of an upper body portion, which is distant from the turbine rotor 4, of the body wall 21. Accordingly, the cooling air inlet ports 24, which make a pair together with the cooling air outlet ports 25, are also formed at the downstream portion, which includes the middle portion in the flow direction of the combustion gas G of the upper body portion, which is distant from the turbine rotor 4 of the body wall 21. That is, the lines Ro of the cooling air outlet ports 25, which are formed at the body wall 21, are formed at the middle portion of the body wall 21 in the flow direction of the combustion gas G and at the downstream portion of the middle portion.

All the lines Ri of the cooling air inlet ports 24 and the lines Ro of the cooling air outlet ports 25, which are formed on both sides of the hypothetical plane P including the axis Ac of the transition piece 20 and the rotation axis Ar of the turbine rotor 4, are oblique with respect to the hypothetical plane so as to be closer to the hypothetical plane P as they approach a rear end of the transition piece 20. That is, in FIG. 2, all the lines Ri of the cooling air inlet ports 24 and the lines Ro of the cooling air outlet ports 25, which are formed at a portion positioned on the left side of the hypothetical plane P, are oblique with respect to the hypothetical plane so as to be closer to the hypothetical plane P as they approach the rear end of the transition piece 20. In addition, all the lines Ri of the cooling air inlet ports 24 and the lines Ro of the cooling air outlet ports 25, which are formed at a portion positioned on the right side of the hypothetical plane P, are oblique with respect to the hypothetical plane so as to be closer to the hypothetical plane P as they approach the rear end of the transition piece 20.

As shown in FIG. 3, a distance Dr between adjacent lines Ro of the plurality of lines Ro of the cooling air outlet ports 25 is larger than a distance Do between adjacent cooling air outlet ports 25 of the plurality of cooling air outlet ports 25 forming the lines Ro. That is, a distance (first distance) Dr between a certain line Ro of the plurality of lines Ro of the cooling air outlet ports 25 and a line Ro adjacent to this line is larger than a distance (second distance) Do between the cooling air outlet ports 25, which are adjacent to each other in the direction of the line Ro, of the plurality of cooling air outlet ports 25 formed on the inner circumferential surface of the transition piece 20.

As shown in FIG. 6, most of the compression air A generated from the compressor 1 is sent into the fuel supplier 11 of the combustor 10 and is injected into the transition piece 20 from the fuel supplier 11 together with fuel. In the transition piece 20, fuel is combusted and high temperature combustion gas G is generated. The high temperature combustion gas G flows into the turbine 2 from the transition piece 20, and rotates the turbine rotor 4.

Further, a part of the compression air A generated from the compressor 1 flows into the transition piece 20 from the outer circumferential side of the transition piece 20 through the cooling air inlet ports 24, the cooling air passages 23, and the cooling air outlet ports 25 of the transition piece 20 as cooling air. For this reason, the inner circumferential surface of the transition piece 20 is protected from high temperature combustion gas G by this cooling air. In addition, the cooling air inlet ports 24 and the cooling air outlet ports 25 have been formed only at the downstream portion of the upper body portion of the body wall 21 in the above description, but are actually formed at the portions of the body wall 21.

As shown in FIG. 2, when the combustion gas G flows on the inner circumferential side, a principal stress σ is applied to the inner circumferential surface of the downstream portion of the upper body portion of the body wall 21 in a direction that is closer to the hypothetical plane P toward the rear end of the transition piece 20. In this embodiment, the cooling air outlet ports 25 forming all the lines Ro are arranged in a direction where the principal stress σ is applied. In other words, the lines Ro of the cooling air outlet ports 25 extend in the direction where the principal stress σ is applied.

As shown in FIG. 3, most of cracks C in the body wall 21 tend to occur from the cooling air outlet ports 25, where the thermal environment is severe and stress is concentrated.

Moreover, the cracks C tend to extend in a direction substantially perpendicular to the direction where the principal stress σ is applied.

For this reason, even if a crack Ca occurs from a certain cooling air outlet port 25a of a certain line Ro and another crack Cb occurs from another cooling air outlet port 25b, which is adjacent to the cooling air outlet port 25a of the same line Ro, when the plurality of cooling air outlet ports 25 forming the lines Ro are arranged in the direction of the principal stress σ that is applied to the transition piece 20, these two cracks Ca and Cb extend in the directions substantially perpendicular to the directions where the respective principal stresses are applied. However, the two cooling air outlet ports, from which the cracks occur, are adjacent to each other in a direction oblique with respect to the axial direction of the body wall, that is, the direction where the principal stress is applied. Accordingly, it is possible to suppress the connection between the two cracks.

Further, in this embodiment, as described above, the distance Dr between adjacent lines of the lines Ro of the cooling air outlet ports 25 is larger than the distance Do between adjacent cooling air outlet ports 25 of the lines Ro. For this reason, even if the crack Ca occurs from a certain cooling air outlet port 25a of a certain line Ro and another crack Cc occurs from another cooling air outlet port 25c of the line Ro, which is adjacent to the line Ro including the cooling air outlet port 25a, it is possible to suppress the connection between these two cracks Ca and Cc.

Figure 4:
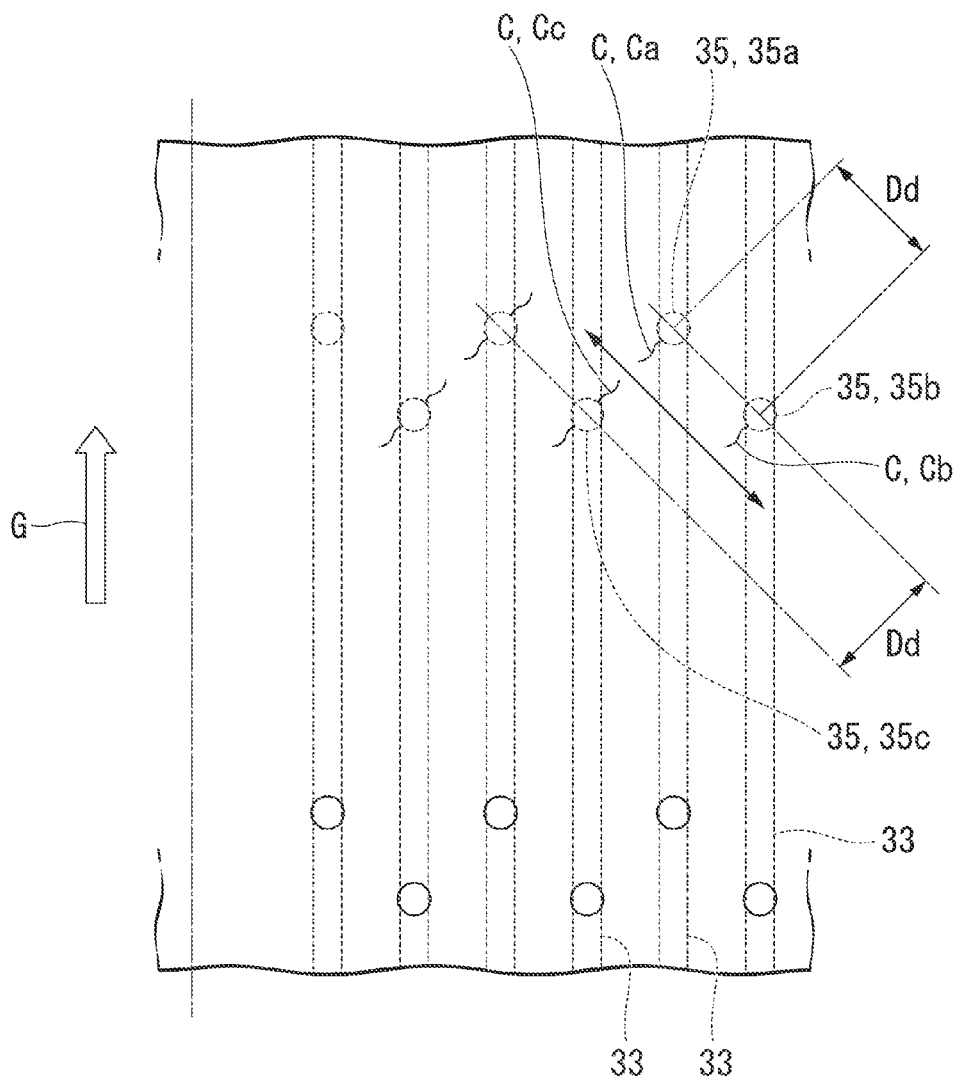
FIG. 4 is a plan view of a main part of a transition piece as a comparative example.

However, in Japanese Unexamined Utility Model Application, First Publication No. S62-150543 as the related art, cooling air outlet ports 35 of a plurality of cooling air passages 33 are arranged so as to be staggered as shown in FIG. 4. Here, it is assumed that a certain cooling air outlet port 35a and another cooling air outlet port 35b adjacent to one side of the cooling air outlet port 35a are arranged in a direction where a principal stress σ is applied. In this case, even if the crack Ca occurs from a certain cooling air outlet port 35a and another crack Cb occurs from another cooling air outlet port 35b as in this embodiment having been described above, it is possible to suppress the connection between these two cracks Ca and Cb.

However, in this case, a cooling air outlet port 35a and a cooling air outlet port 35c are arranged in a direction substantially perpendicular to a direction where a principal stress σ is applied, and a distance Dd between the cooling air outlet ports 35a and 35c is relatively short. For this reason, when the crack Ca occurs from a certain cooling air outlet port 35a and another crack Cc occurs from another cooling air outlet port 35c, a possibility that the two cracks Ca and Cc are connected to each other becomes very high.

That is, there is a case where the growth of the cracks C cannot be suppressed in Japanese Unexamined Utility Model Application, First Publication No. S62-150543.

In this embodiment, it is possible to suppress the connection between the cracks Ca and Cb and the connection between the cracks Ca and Cc as described above even if the crack Ca occurs from a certain cooling air outlet port 25a and the other cracks Cb and Cc occur from other cooling air outlet ports 25b and 25c, which are adjacent to the cooling air outlet port 25a regardless of directions. That is, in this embodiment, it is possible to suppress the growth of the cracks C as compared to the technique disclosed in Japanese Unexamined Utility Model Application, First Publication No. S62-150543 even if a distance between the plurality of cooling air passages 23 is reduced.

Figure 8:
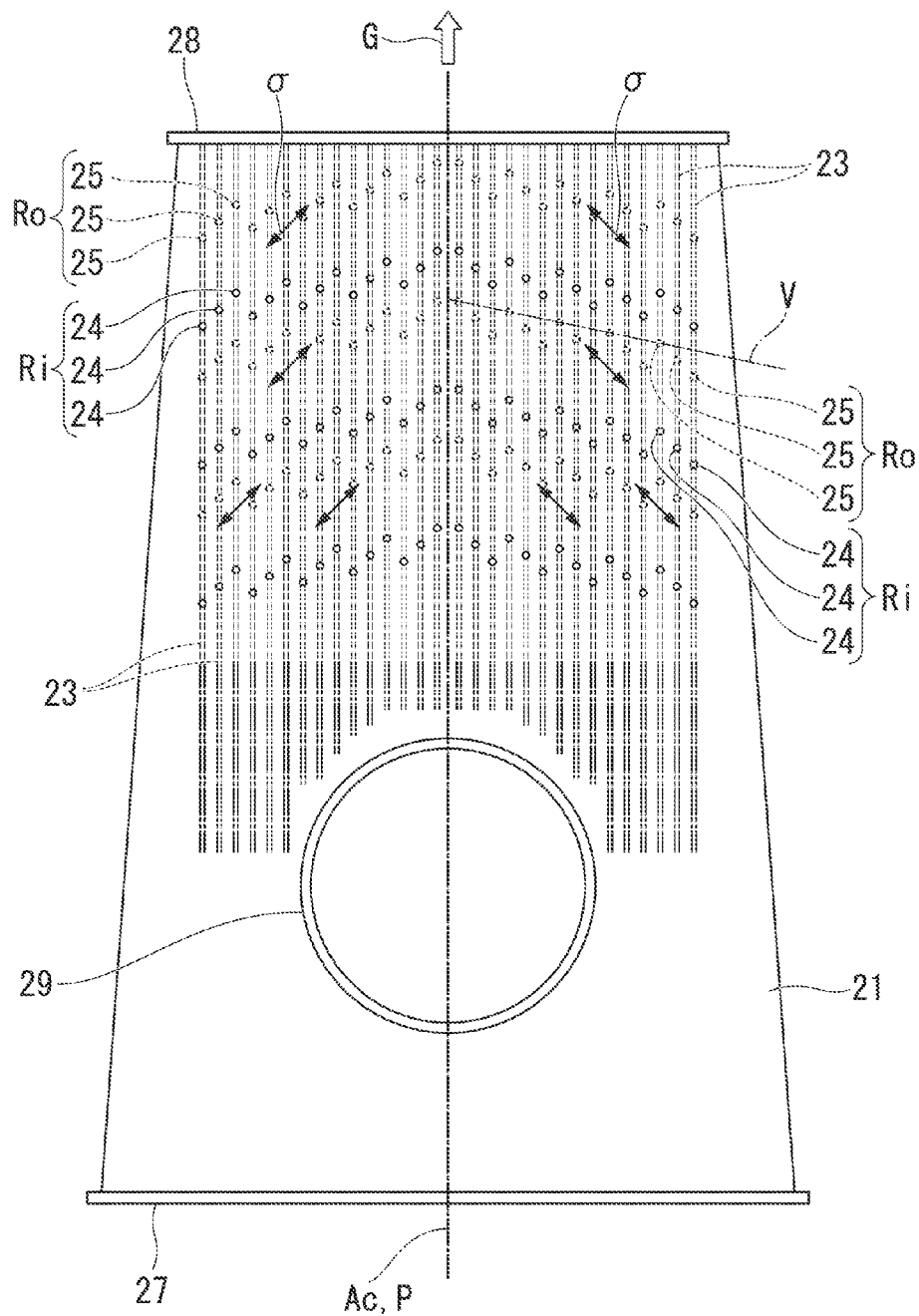
FIG. 8 is a plan view of a transition piece according to a modification of the embodiment of the invention.
Figure 9:
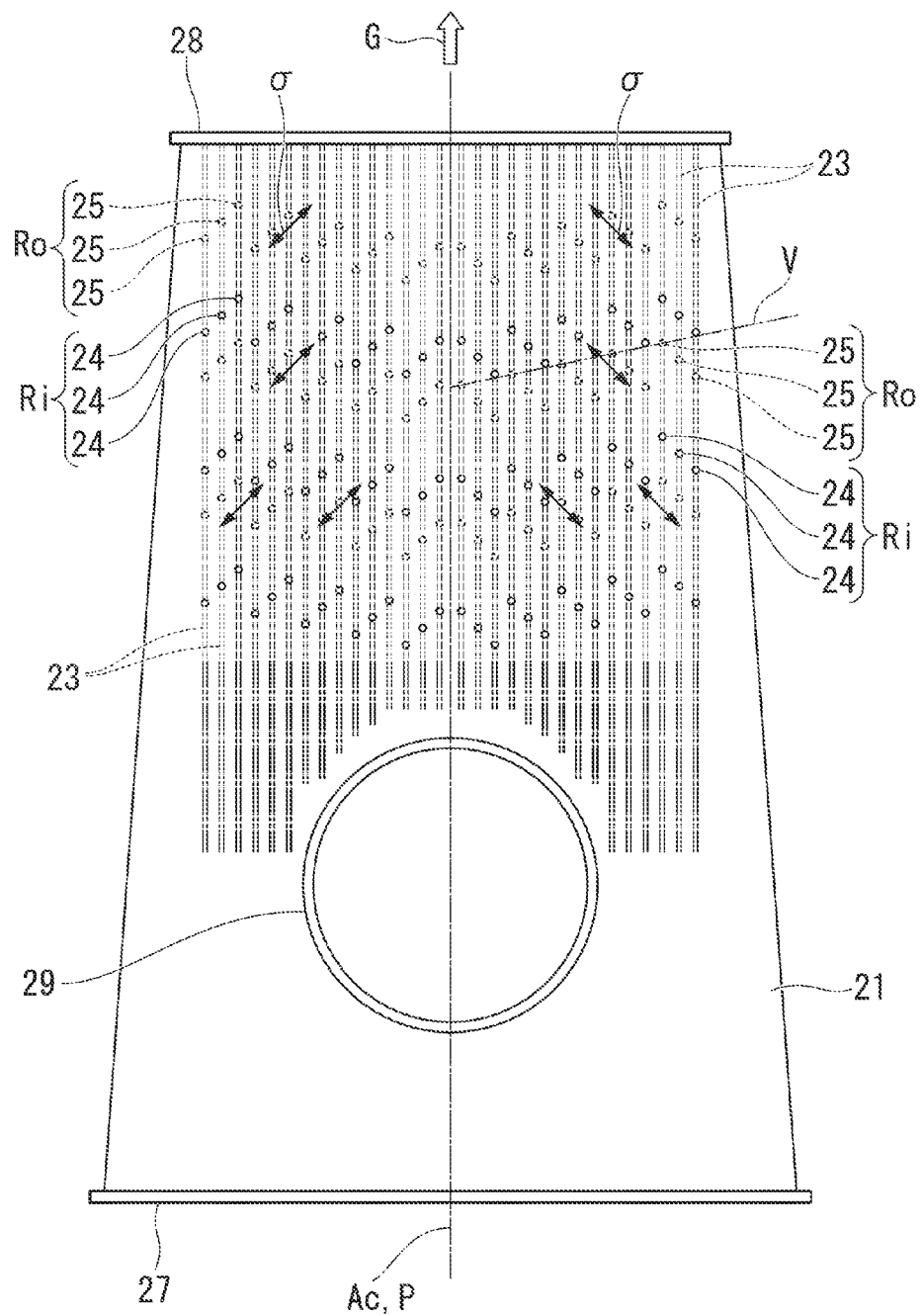
FIG. 9 is a plan view of a transition piece according to another modification of the embodiment of the invention.

In addition, in the above-mentioned embodiment, as shown in FIG. 2, the plurality of lines Ri of the cooling air inlet ports 24 or the plurality of lines Ro of the cooling air outlet ports 25 have been arranged in the direction V perpendicular to the hypothetical plane P of the transition piece 20. However, the invention is not limited thereto, and for example, a plurality of lines Ri of cooling air inlet ports 24 or a plurality of lines Ro of cooling air outlet ports 25 may be arranged in a direction V oblique with respect to the axis Ac of the transition piece 20 as shown in FIGS. 8 and 9.

Further, the distance Dio between the cooling air inlet port 24 and the cooling air outlet port 25, which make a pair, of each of the cooling air passages 23 is substantially the same in the plurality of cooling air passages 23 in the above-mentioned embodiment, but may not necessarily be the same in the plurality of cooling air passages 23.

Further, the line Ro of the cooling air outlet ports 25 has been formed of three cooling air outlet ports 25 in the above-mentioned embodiment. However, as the number of the cooling air outlet ports 25 forming the line Ro is increased, the distance Dr between adjacent lines Ro is increased. Accordingly, it is possible to further suppress the growth of the cracks C. For this reason, the line Ro of the cooling air outlet ports 25 may be formed of four or more cooling air outlet ports 25.

A preferred embodiment of the invention has been described above, but the invention is not limited to the above-mentioned embodiment. The addition, omission, replacement, and substitution of the structure and other modifications thereof may be made without departing from the scope of the invention. The invention is not limited to the above description, and is limited only by the accompanying claims.

What is claimed is:

1. A transition piece of a combustor that sends high temperature combustion gas to a turbine, the transition piece comprising:
   a cylindrical-formed body wall; and
   a plurality of cooling air passages formed in the body wall so as to extend in an axial direction of the cylindrical body wall, each of the cooling air passages having cooling air inlet ports opened at an outer circumferential surface of the transition piece and cooling air outlet ports opened at an inner circumferential surface of the transition piece;
   wherein the cooling air outlet ports which are adjacent to each other form a plurality of parallel lines in a direction oblique with respect to the axial direction of the body wall, and
   wherein a first distance between a first line of the cooling air outlet ports among the plurality of parallel lines and a second line of the cooling air outlet ports among the plurality of parallel lines, adjacent to the first line, is larger than a second distance between the cooling air outlet ports adjacent to each other and on a same line among the plurality of parallel lines.

2. The transition piece of the combustor according to claim 1, wherein
   when assuming a hypothetical plane including a rotation axis of a turbine rotor of the turbine and an axis of the cylindrical body wall, the lines of the cooling air outlet ports formed in one side part of the body wall are oblique with respect to the hypothetical plane so as to be closer to the hypothetical plane as they approach to a rear end of the transition piece, and
   the lines of the cooling air outlet ports formed in the other side part of the body wall are also oblique with respect to the hypothetical plane so as to be closer to the hypothetical plane as they approach the rear end of the transition piece.

3. The transition piece of the combustor according to claim 1, wherein
each of the lines of the cooling air outlet ports includes three or more of the cooling air outlet ports.

4. The transition piece of the combustor according to claim 1, wherein
the lines of the cooling air outlet ports are formed in the body wall so as to be located at the middle portion of the body wall in a flow direction of the combustion gas and at a downstream side of the middle portion.

5. The transition piece of the combustor according to claim 1, wherein
a distance between the cooling air inlet port and the cooling air outlet port is the same for each of the cooling air passages.

6. The transition piece of the combustor according to claim 1, wherein
the lines of the cooling air outlet ports extend in a direction of a principal stress caused in the inner circumferential surface of the body wall while the combustion gas flows inside the body wall.

7. A gas turbine comprising:
a combustor having the transition piece according to claim 1;
a compressor configured to supply compression air to the combustor; and
a turbine configured to be driven by combustion gas generated in the combustor.

8. The gas turbine according to claim 7, wherein
when assuming a hypothetical plane including a rotation axis of a turbine rotor of the turbine and an axis of the cylindrical body wall, the lines of the cooling air outlet ports formed in one side part of the body wall are oblique with respect to the hypothetical plane so as to be closer to the hypothetical plane as they approach to a rear end of the transition piece, and
the lines of the cooling air outlet ports formed in the other side part of the body wall are also oblique with respect to the hypothetical plane so as to be closer to the hypothetical plane as they approach the rear end of the transition piece.

9. The gas turbine according to claim 7, wherein
each of the lines of the cooling air outlet ports includes three or more of the cooling air outlet ports.

10. The gas turbine according to claim 7, wherein
the lines of the cooling air outlet ports are formed in the body wall so as to be located at the middle portion of the body wall in a flow direction of the combustion gas and at a downstream side of the middle portion.

11. The gas turbine according to claim 7, wherein
a distance between the cooling air inlet port and the cooling air outlet port is the same for each of the cooling air passages.

12. The gas turbine according to claim 7, wherein
the lines of the cooling air outlet ports extend in a direction of a principal stress caused in the inner circumferential surface of the body wall while the combustion gas flows inside the body wall.

* * * * *